April 3, 1945.  J. A. KENNEDY  2,373,028
MOTOR VEHICLE
Filed Dec. 30, 1941  2 Sheets-Sheet 2
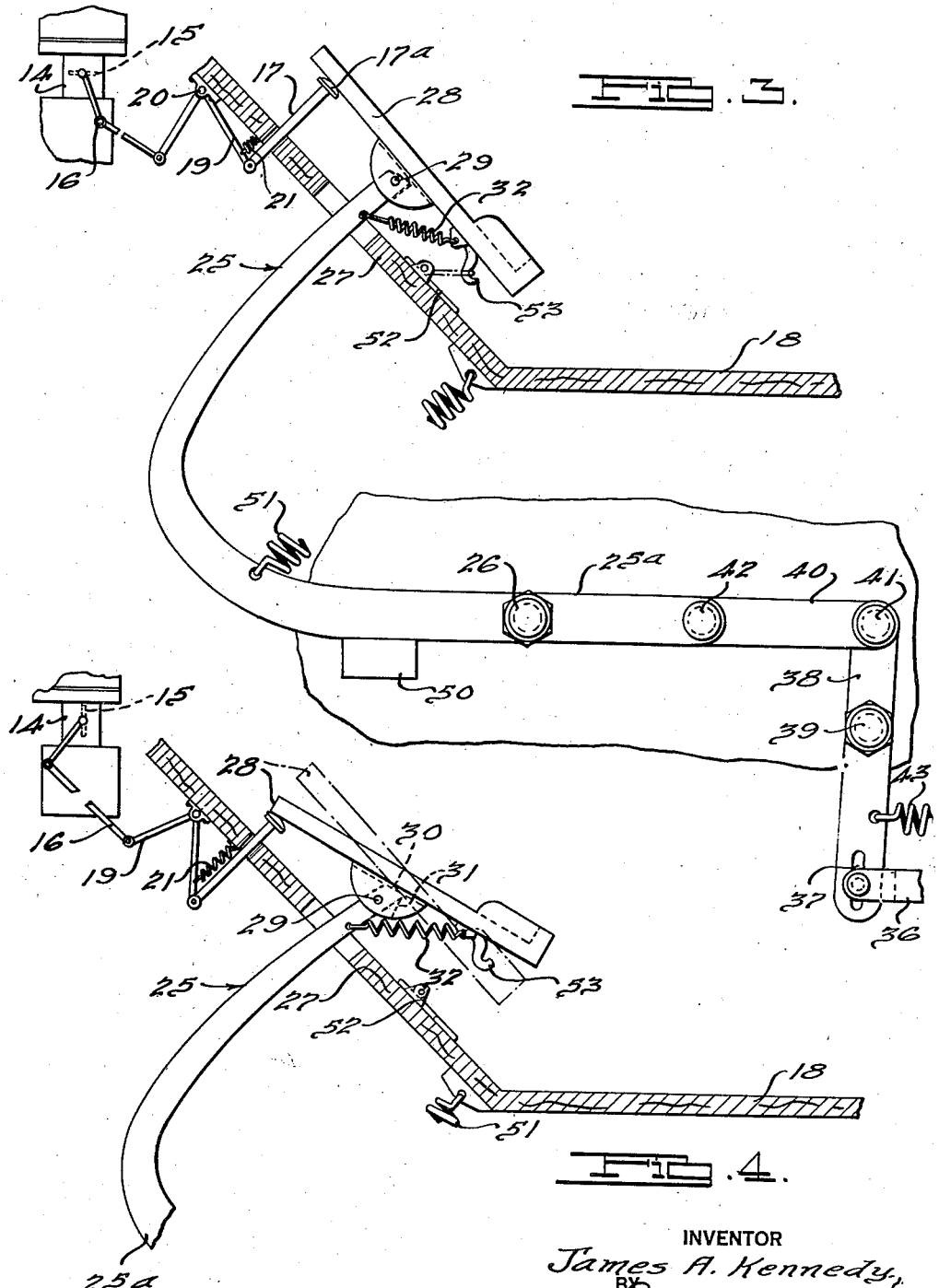
INVENTOR
James A. Kennedy,
BY
Gregory S. Dolgorukov
ATTORNEY Patented Apr. 3, 1945

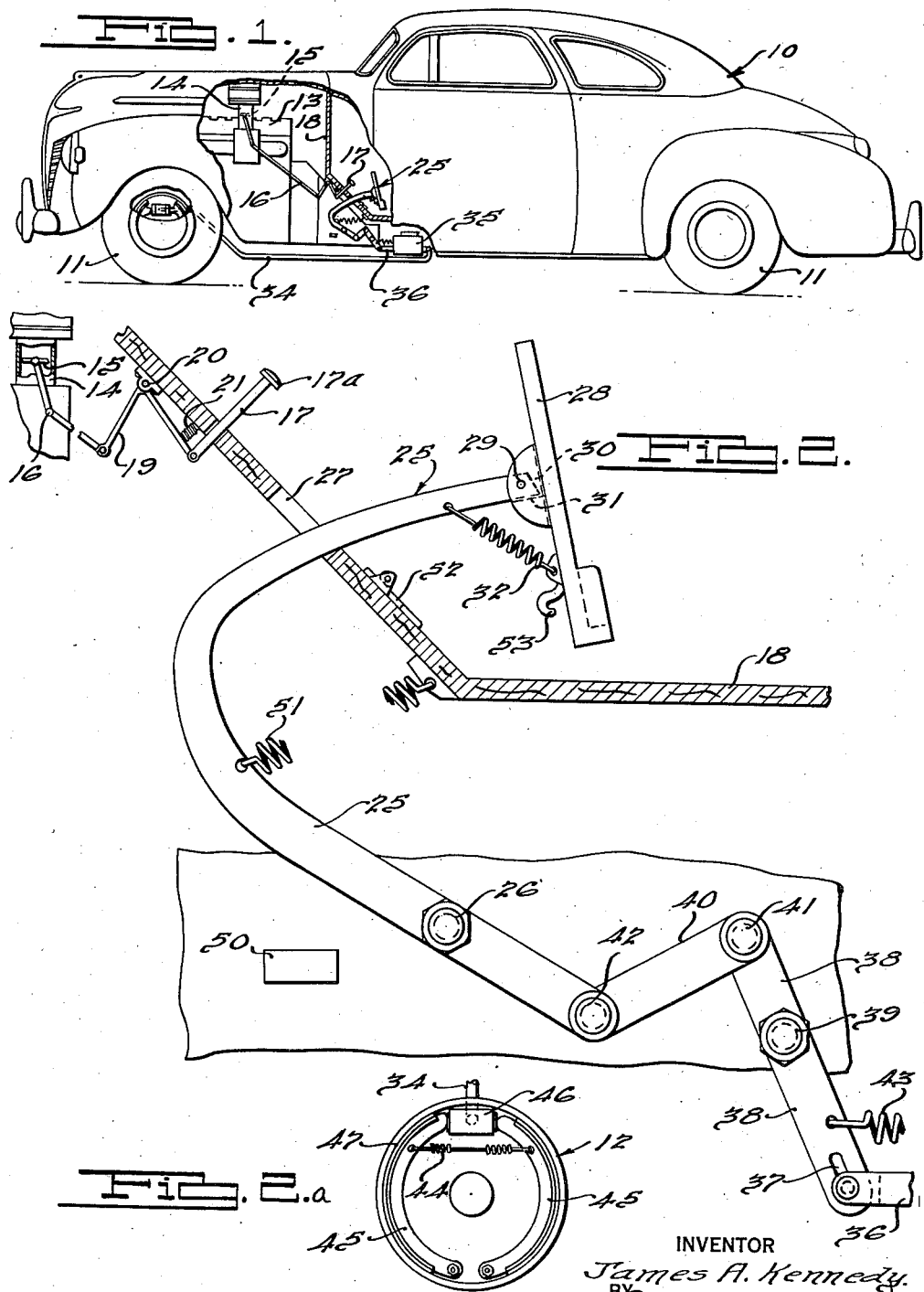

2,373,028

UNITED STATES PATENT OFFICE 2,373,028

MOTOR VEHICLE

James A. Kennedy, Ann Arbor, Mich.

Application December 30, 1941, Serial No. 424,951

8 Claims. (Cl. 192—3)

This invention relates to motor vehicles and more particularly to an improved motor and brake control system therefor.

One of the objects of the present invention is to provide an improved control system for the engine and the brakes of a motor vehicle.

Another object of the invention is to provide an improved braking system for motor vehicles, means being provided for automatic application of brakes when the vehicle gets out of control, such as may happen in an accident when the operator loses consciousness before the vehicle is stopped and the vehicle is about to roll off the road into a ditch or downhill, or when the operator is about to become asleep or loses manual reach of the control system for any other cause or reason.

A further object of the invention is to provide an improved motor vehicle in which means are provided to ensure secure and constant application of brakes, thereby preventing pushing of an unattended vehicle for any appreciable distance or moving of the vehicle should the engine thereof be started accidentally by children.

A further object of the invention is to provide an improved motor vehicle having means whereby the brakes are automatically applied as soon as the vehicle is parked and the driver releases manual hold of the vehicle control system.

A still further object of the invention is to provide an improved motor vehicle having brakes and a pedal for operating the same, means being provided whereby said brakes are applied as soon as said pedal is released and are released as soon as the pedal is depressed.

A still further object of the invention is to provide a motor vehicle of the character specified in the preceding paragraph, means being provided for selectively locking the brake pedal in its depressed position.

A still further object of the present invention is to provide an improved motor vehicle in which separate accelerator and brake pedals are eliminated, and operation of the brakes as well as control of the throttle valve of the vehicle engine is effected with the aid of a single pedal.

A still further object of the present invention is to provide an improved motor vehicle having means eliminating the necessity for the vehicle operator for transferring his foot from the accelerator pedal to the brake pedal in cases of sudden stops and thus considerably shortening the time necessary for application of brakes in emergencies.

A still further object of the present invention is to provide a motor vehicle having improved engine and brakes control system, said system being of such a character that it inherently prevents application of brakes when throttle valve is fully or partially opened and the engine is driving the vehicle, and in which the throttle valve without operation of special means is brought into its idling position as the brakes are being applied. In conventional structures having unitary or combined accelerator and brake pedals, in which both the opening of the throttle valve and the application of brakes require operation of the control member in the same direction, such as depressing the pedal downwardly, very complicated means have to be provided, said means being actuated to move the throttle valve in the closing direction when the pedal is depressed for applying the brakes. Various complications are also introduced in such structures in order to permit depressing the pedal for opening the throttle valve without applying the brakes.

A still further object of the invention is to provide an improved motor vehicle having a manual control system for operating the vehicle engine and the brakes, in which system operations of the control members for forward movements of the vehicle such as releasing the brakes and opening the throttle valve are effected by operating said control members forwardly, while retarding the speed of the vehicle and stopping the same is effected by moving said control members or permitting them to move in the rearward direction, and thereby connecting in the mind of the operator the direction of the vehicle travel and the direction of the necessary controlling movements of the control member.

A still further object of the invention is to provide an improved motor vehicle having a single pedal for controlling both the vehicle engine and the brakes, means being provided to apply the brakes when the pedal is released and to release the brakes when the pedal is depressed, means being also provided to resist, when the pedal is depressed for operating the throttle valve, the force tending to move the pedal into its released position, thereby preventing unnecessary fatigue.

A still further object of the invention is to provide an improved motor vehicle of the character specified in the preceding paragraph, means being provided to ensure return of the pedal from its fully depressed position into its fully released or extended position.

It is an added object of the present invention to provide an improved structure of the foregoing character which is simple in construction, safe and dependable in operation, and is relatively inexpensive to manufacture and service.

Other objects of this invention will appear in the following description and appended claims, reference being had to the accompanying drawings forming a part of this specification wherein like reference characters designate corresponding parts in the several views.

Fig. 1 is a view showing a motor vehicle embodying the present invention, parts of the motor vehicle structure being cut out in order to show the construction thereof more clearly.

Fig. 2 is a diagrammatic view illustrating my improved brake and throttle valve control system, the pedal being shown released and the throttle valve in its idling position.

Fig. 2a is a diagrammatic view showing the brake structure with its operative parts in positions corresponding to the operation conditions of Fig. 2.

Fig. 3 is a view similar in part to Fig. 2, showing the system with its parts in positions for operation of the vehicle, the pedal being shown fully depressed and the pedal foot rest just contacting the throttle valve operating mechanism with the throttle valve still in its idling position.

Fig. 4 is a view similar in part to Fig. 3, the pedal foot rest being shown depressed for opening the throttle valve.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The present invention is herein described as embodied in a motor vehicle propelled by an internal combustion engine and having four wheel brakes of the hydraulic type. It will be understood, however, that the invention is not limited to vehicles having engines or brakes of the above specified type but may be used successfully in connection with different types of engines and brakes.

Referring to the drawings, and particularly to Fig. 1 thereof, the structure illustrated therein is a motor vehicle of the passenger type, indicated generally by the numeral 10. The motor vehicle may be of any suitable type, and therefore no detailed description thereof is deemed necessary herein. The vehicle includes wheels 11 each provided with a brake mechanism generally indicated by the numeral 12. Provision of a brake on each wheel is in conformity with the present practice but it is not necessary for proper operation of the structure embodying the present invention. The brakes may also be of any suitable type, hydraulic brakes being shown in the present instance. An engine 13, in the present instance of the internal combustion type, is mounted on the vehicle structure. Connection of the engine with the driving wheels and clutch means for selectively disconnecting the engine from the wheels may also be of any practical type. The engine includes an intake passage 14 in which there is operatively mounted a throttle valve 15. Said throttle valve is adapted to be moved between its substantially closed or idling position and its fully open position, thereby controlling the engine from its idling condition to the condition in which it delivers its maximum torque.

The throttle valve 15 is actuated with the aid of a suitable mechanism, in the present instance with a linkage generally indicated by the numeral 16 and shown in the drawings in a diagrammatic manner. A push rod 17 forming a part of said linkage and having a head 17a formed on one of its ends protrudes through the floor 18. The opposite end of said push rod 17 is connected to a bell crank 19 hingedly mounted as indicated at 20 in a bracket secured to the floor 18. A spring 21 is provided, said spring being adapted to exert a pulling force on the bell crank 19 and thereby to maintain it in the position indicated in Fig. 2, thus, if unopposed, constantly maintaining the throttle valve 15 in its idling position.

In accordance with the invention separate brake pedal and accelerator pedal are eliminated, and there is provided a single pedal, generally indicated by the numeral 25, hingedly mounted on the vehicle structure, as indicated at 26. One end of the pedal stem 25a protrudes through a hole 27 provided in the floor 18 and it carries a foot rest 28 hingedly mounted thereon as shown at 29. The foot rest 28 is adapted to move around a hinge 29 as a center within predetermined limits determined by a slanted portion 30 provided on the end of said pedal stem and an abutment 31 provided on the foot rest. A tension spring 32 having ends anchored respectively on the pedal stem 25a and the foot rest 28 tends to maintain the foot rest in the position shown in Fig. 2 with the abutment 31 contacting the pedal stem near the end thereof.

The brakes 12 are hydraulically actuated. The brake actuating mechanism employed in the present embodiment of the invention comprises a master cylinder 35 operatively mounted on the vehicle structure and having a piston or plunger (not shown) slidably fitted therein. The piston has a rod 36 protruding from the cylinder structure and hingedly connected to a link 38, a compensating slot 37 being provided to prevent binding or bending of the connected links. The link 38 is hingedly mounted on the vehicle structure as indicated at 39. The opposite end of the link 38 is connected with the aid of a connecting link 40 to the end of the bent pedal stem 25a, said link 40 terminating in hinge connections 41 and 42. A relatively heavy spring 43 of the tension type is provided, said spring having one end anchored on the master cylinder 35, while its opposite end is connected to the link 38. Unless opposed by foot pressure on the pedal 25, said spring 43 is capable of exerting a sufficient force on the piston rod 36 thereby creating hydraulic pressure within the master cylinder for application of brakes. Thus, unopposed by the pressure force produced by the operator's foot, the brake spring 43 tends to maintain the brakes constantly in their applied positions, as is illustrated in Fig. 2a. If on the other hand the operator exerts pressure on the foot rest 28 of the pedal, the stem 25a thereof operates the links 40 and 38 and exerts pressure force on the piston rod 36 thereby moving the master cylinder piston in the direction opposite to that in which said piston moves for creating pressure in the hydraulic cylinder. In consequence thereof the hydraulic pressure within the system rapidly diminishes which condition is momentarily transmitted to brakes 12 through hydraulic conduits 34 and the brake drum springs 44 of said brakes become capable of withdrawing the brake shoes 45 in each brake from the braking contact with the brake lining 47 against the resistance of the two pistons provided in the wheel cylinder 46.

It will now be clear in view of the foregoing that in my improved construction the operation of the brakes is opposite to that employed in conventional motor vehicles. While in conventional motor vehicles the brakes are in their released position constantly and are not applied unless the brake pedal is depressed, in my improved structure the brakes are constantly applied and are released only when the foot pedal 25 is depressed. By virtue of such a construction numerous advantages are attained. For instance, should the vehicle get out of control, such as may happen in an accident when the operator loses consciousness before the vehicle stops, the brakes will be automatically applied and dangerous uncontrolled motion of the vehicle prevented. It is often the case in an accident that a continued uncontrolled rolling of the vehicle causes the same to get into the road ditch or in the path of oncoming vehicles, or roll off downhill, producing more serious consequences than those caused by the initial collision. It should also be noted that with my improved structure, should the operator become sleepy on a long night drive, relaxation of his leg muscles will immediately cause the spring 43 to commence application of the brakes, which will either stop the vehicle and stall the engine or will immediately wake up the operator.

With conventional vehicles it often happens that the ignition key is accidentally left in operative position, and small children start the vehicle. If the hand brake were not applied before leaving the vehicle, it may be operated and moved for a certain distance producing an accident. Occurrence of such a condition is prevented in my improved structure, since even if the vehicle is left in gear, starting thereof will immediately cause stalling of the engine, since the brakes are applied. If my improved motor vehicle is left unattended the brakes are constantly applied, and the vehicle cannot be pushed out of a parking place unless the brakes are released. In addition, with the use of my improved motor vehicle, the time required for parking is greatly reduced, since as soon as the operator brings the vehicle into a proper position and releases the foot pedal, the brakes are automatically applied. Leaving a parked car with released brakes, which is a common occurrence with conventional vehicles, is also eliminated in the operation of my improved motor vehicle.

When the brake pedal 25 is in its fully depressed position, the pedal stem 25a thereof contacts a stop 50 as shown in Fig. 3. In this position of the pedal the stop 50 resists further bodily movement of the pedal, and only the foot rest 28 thereof may be operated to rotate around its hinge 29. As can be seen from an examination of Fig. 3, in the fully depressed position of the pedal, the foot rest 28 contacts the head 17a of the push rod 17. Therefore, by pressing the foot rest 28 with a rotative movement of the foot, similarly to operating a conventional accelerator pedal, the operator actuates the linkage to control the throttle valve 15 and to move the same toward its fully open position, as shown in Fig. 4 in full lines. When the foot rest 28 is released, the spring 21 returns the throttle valve 15 into its idling position, while the foot rest springs 32 brings the foot rest into its position indicated in Fig. 4 in dotted lines. In said Fig. 4 the foot rest 28 is shown by full lines in its fully depressed position, the throttle valve 15 being fully opened. As can be seen from an examination of Figs. 3 and 4, in the fully depressed position of the pedal 25, the brakes 12 are released.

The stop 50 provides sufficient support for the pedal structure as well as for the weight of the operator's leg and foot, and therefore when the brake pedal 25 is in its fully depressed position, the operation of the foot rest 28 is in no way tiresome for the operator and in fact it does not differ appreciably from operating a conventional accelerator pedal. It will now be understood from an examination of the drawings that when the pedal 25 is fully depressed for operating the throttle valve of the engine, the weight of the operator's leg, which may be considered as a single force acting downwardly and passing through the ankle joint of the operator's foot, is supported by the foot rest 28, in turn supported at the hinge 29. The supporting reaction forces exerted by said hinge 29 and the foot rest 28 act on the operator's foot, which may be considered structurally as an arch, substantially through the heel (which forms one abutment of said arch) and also as much through the front part of the arch of the foot (which forms the second abutment of said foot arch) so as to produce resultant reaction forces of equal magnitude acting along the same line passing through the ankle (which may be considered as providing the "key" point of the arch) but in the direction opposite to the force representing the weight of the operator's leg. Such an arrangement ensures maximum driving comfort by properly supporting the weight of the operator's leg and preventing strain of abdominal muscles, which strain, if prolonged by long driving, may seriously affect the operator's health, particularly that of a woman. Should it become necessary to stop the vehicle, the operator simply releases his foot pressure on the pedal 25, in consequence whereof the same moves toward its released position causing application of the brakes as well as automatic bringing of the throttle valve 15 into its idling position. If only a retarding of the vehicle speed is necessary, the operator simply moves his foot to bring the foot rest 28 near the position indicated in Fig. 3, which brings the throttle valve 15 substantially into its idling position. When gentle application of the brakes is desired, the operator releases the foot pedal 25 gradually, in consequence whereof application of the brakes may be regulated in any desired way. Thus all forward movements of the vehicle require forward movements of the operator's leg and foot, while retarding the speed of the vehicle and stopping it require withholding of the foot. Such control movements being more logical are more quickly associated with vehicle movements.

In emergency stops brakes may be applied very quickly, since in my improved construction it is not necessary to transfer the operator's right foot from the accelerator pedal to the brake pedal, which transferring implies release of the accelerator pedal, moving the leg in order to bring the foot from said accelerator pedal to the brake pedal and depressing the brake pedal to apply the brakes. Such a multiple operation movement requires approximately one second, in which second a vehicle travelling, for instance, at a speed of thirty miles per hour moves a distance of approximately forty-four feet. The reduction in time necessary for emergency brake applications is a great advantage of my improved motor vehicle.

In accordance with the invention means are provided to decrease or substantially to eliminate in the fully depressed position of the pedal 25 the force which is exerted on the pedal by the brake applying means, brake spring 43 in the present instance. It can be clearly understood from an examination of the drawings that unless such means are provided, constantly holding the foot pedal in its fully depressed position while driving will result in objectionable fatigue. Various means may be employed to serve the above purpose. In the present embodiment of the invention said means are incorporated into the linkage forming the force transmitting system between the pedal 25 and the master cylinder 35. In accordance with the invention the lengths of the respective links and positions of the hinges 26 and 39 are so selected that when the foot pedal 25 is depressed, the linkage comes to its substantially dead center, and therefore the force of the brake spring 43 which said spring exerts on the brake pedal gradually diminishes, approaching zero in the fully depressed position of the pedal. Such a position of the linkage is illustrated in Fig. 3, wherein hinges 26, 41 and 42 are shown disposed substantially along a straight line. In said position, the weight of the operator's foot alone is sufficient to maintain the brake pedal in its fully depressed position, and therefore no uncomfortable fatigue may occur. Means are also provided to insure that the brake pedal 25 moves out of its depressed position as soon as the foot pressure thereon is released. In the present embodiment of the invention said means are exemplified by a tension spring 51, which spring is considerably lighter than the brake spring 43. The force which the spring 51 exerts on the brake pedal 25 is relatively light, but nevertheless it is sufficient to launch the pedal 25 and to move it from its fully depressed position toward its fully released or extended position until the effective leverage of the linkage increases to a degree when force of the spring 43 alone becomes sufficient to carry the linkage and the brake pedal 25 into its extended position for application of brakes.

It will be understood however that separate means such as spring 51 may be dispensed with and the stop 50 so arranged that the linkage does not come exactly to its dead center but approaches it sufficiently close to render the effective leverage in the linkage so small that the force of the spring 43 produces insufficient turning effort on the brake pedal 25 to be noticed by the operator. However, provision of additional means such as the spring 51 may be desirable as insuring still more reliable operation of the pedal.

Should it become necessary to release the brakes while the operator is not in the seat, as in the case when some repairs are being made on the car, the same may be effected by depressing the pedal and locking it in its fully depressed position with the aid of suitable means, such as a spring hook 52 provided on the floor 18. This is done manually and the character of the spring hook 52 is such that undesirable self-locking of the pedal is prevented. Unhooking of the pedal is also done manually. Should it become necessary to operate the throttle valve without releasing the brakes, which may be the case when the car stalls while travelling uphill, or during repairs, the same may be done without application of the hand brake by simply reaching under the foot rest 28 of the pedal 25 and pressing on the head 17a of the push rod 17, or by using the hand throttle button usually provided in motor vehicles.

There is thus provided an improved motor vehicle in which a foot pedal acting opposite to the brake pedal of a conventional motor vehicle is adapted to serve as a unitary brake and throttle valve control pedal. By virtue of the above construction and other features herein described, the objects of the present invention listed above and numerous additional advantages are attained.

I claim:

1. In a motor vehicle having an engine, a valve controlling said engine, brakes for slowing down and stopping said vehicle, a pedal operatively connected to said brakes to have said brakes released with said pedal is depressed, means for actuating said valve, said means being adapted to maintain said valve in its idling position, a foot operated member forming a part of the pedal structure and movable relative thereto, said member being adapted in the depressed position of the pedal to support the heel of the operator's foot and to contact said valve actuating means substantially under the front part of the operator's foot for operating said valve.

2. In a motor vehicle having an engine, a throttle valve controlling said engine, brakes for slowing down and stopping said vehicle, a foot pedal operatively connected to said brakes to have said brakes released when said pedal is depressed, and means adapted to apply said brakes and to move said pedal into its fully extended position when foot pressure on said pedal is decreased below a predetermined value, means actuating said throttle valve and adapted to move said valve toward its idling position, a foot operated member carried by said pedal and movable relative thereto, said member being adapted in the depressed position of the pedal to support the foot of the operator substantially at the heel and to contact said valve actuating means for operating said valve in response to depressing and releasing movements of the operator's foot, and means reducing substantially to zero, in the fully depressed position of the pedal, the force which said brake applying means exert on said pedal.

3. In a motor vehicle having an engine, a throttle valve controlling said engine, brakes for slowing down and stopping said vehicle, a foot pedal operatively connected to said brakes to have said brakes released when said pedal is depressed, means adapted to apply said brakes and to move said pedal into its fully extended position when foot pressure on said pedal is decreased below a predetermined value, means actuating said throttle valve and adapted to move said valve toward its idling position, a foot operated member carried by said pedal and movable relative thereto, said member being adapted in the depressed position of the pedal to support the foot of the operator substantially at the heel and to contact said valve actuating means for operating said valve in response to depressing and releasing movements of the front part of the operator's foot, and linkage means forming a force transmitting system between said brake applying means and said pedal and adapted in the fully depressed position of the pedal to decrease substantially to zero the effective leverage through which said brake applying means act on said pedal.

4. In a motor vehicle having an engine, a throttle valve controlling said engine, brakes for slowing down and stopping said vehicle, spring means adapted to maintain said brakes applied, a foot operated pedal movable between its fully extended and depressed positions and operatively connected to said spring means, said pedal being normally adapted to be moved by said spring means into its fully extended position, and means for releasing said brakes when said pedal is moved by foot pressure into its fully depressed position, a hinged foot rest on said pedal, means for actuating said throttle valve, said means being adapted, when unopposed by said foot rest, to bring said throttle valve into its idling position, and to be contacted by said foot rest in the fully depressed position of the pedal and to be actuated thereby for operating said throttle valve by the depressing and releasing movements of the front part of the operator's foot.

5. In a motor vehicle having an engine, a throttle valve controlling said engine, brakes for slowing down and stopping said vehicle, spring means adapted to maintain said brakes applied, a foot operated pedal movable between its fully extended and depressed positions and operatively connected to said spring means, said pedal being normally adapted to be moved by said spring means into its fully extended position, and means for releasing said brakes when said pedal is moved by foot pressure into its fully depressed position, means for actuating said valve, said means being adapted to maintain said valve in its idling position and to be contacted by said pedal in the depressed position thereof and to be operated by said pedal for operating said valve in response to the movements of the front part of the operator's foot, and linkage means forming a force transmitting system between said brake applying means and said pedal and adapted in the fully depressed position of the pedal to come and to remain substantially to its dead center and thus to hold substantially to zero the effective leverage through which said brake applying means act on said pedal, and means for selectively locking said pedal in its fully depressed position and said foot rest in a position corresponding to the idling position of the throttle valve.

6. In a motor vehicle having an engine and brakes, means normally maintaining said brakes applied, a single articulated pedal adapted to release said brakes by its bodily movements in response to depression movements of the operator's leg, and to control said engine while remaining bodily stationary by the movements of its articulated parts in response to depression and release movements of the front part of the operator's foot.

7. In a motor vehicle having an engine and brakes, means normally maintaining said brakes applied, a single articulated foot pedal, said pedal being adapted when fully depressed in opposition to said brake applying means to release said brakes and to control said engine by rotative movements of one of its articulated parts, and linkage means tending to render said brake applying means substantially powerless during the control of said engine, said linkage being adapted to remain stationary during control of the engine by said rotative movements.

8. In a motor vehicle having an engine and brakes, means normally maintaining said brakes applied, a single articulated pedal adapted to release said brakes by its bodily depression movements and to control said engine while remaining bodily stationary in its fully depressed position by the movements of its parts, said parts being responsive to the movements of the front part of the operator's foot, and linkage means adapted in the fully depressed position of said pedal to reduce the effective leverage of said brake applying means substantially to zero.

JAMES A. KENNEDY.